United States Patent Office 2,818,302
Patented Dec. 31, 1957

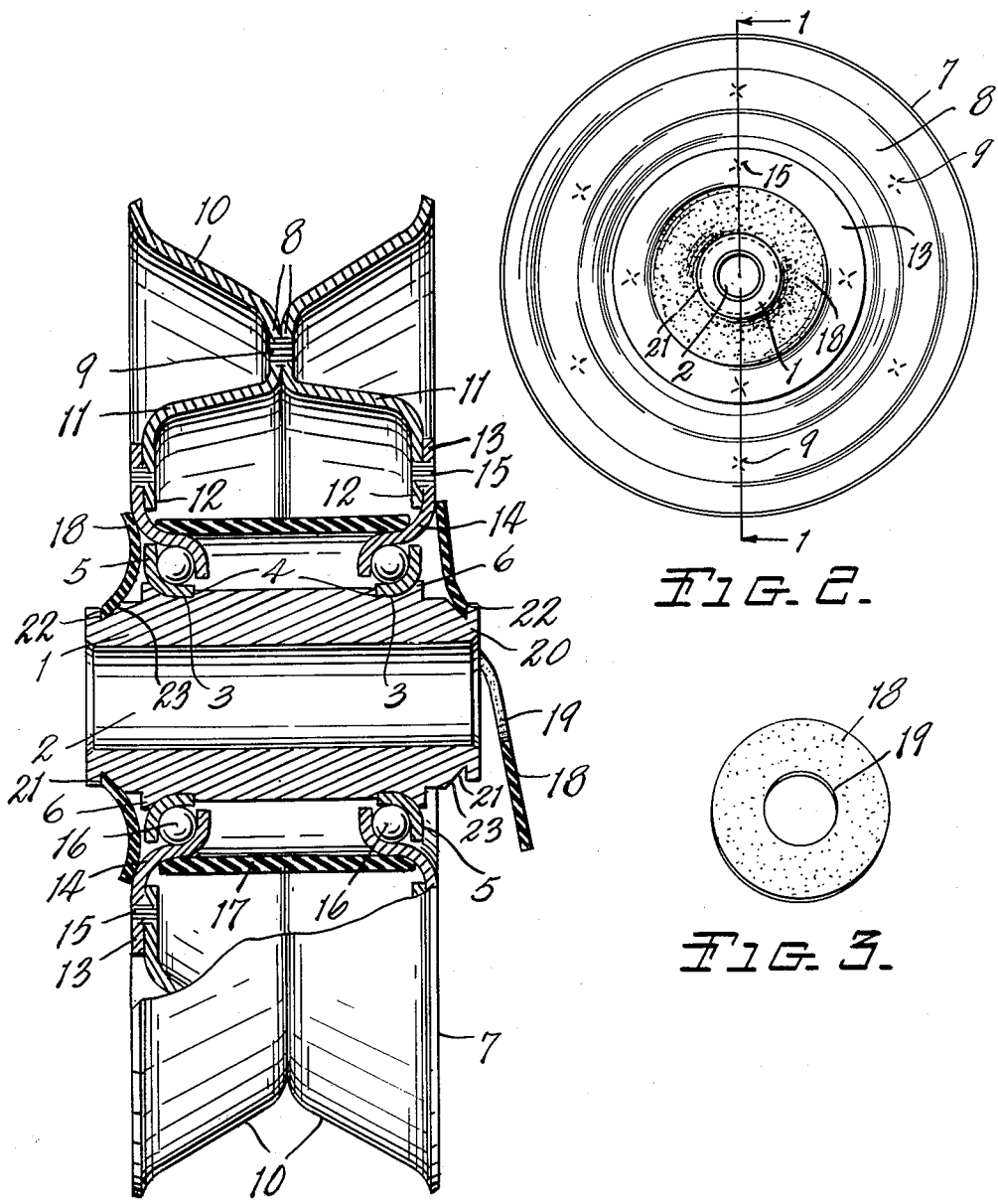

2,818,302

WHEEL AND BEARING ASSEMBLY

John W. Black, Jr., Kalamazoo, Mich., assignor to Pemco Wheel Company, Kalamazoo, Mich.

Application February 14, 1955, Serial No. 487,903

7 Claims. (Cl. 301—63)

This invention relates to a wheel and bearing assembly well adapted for use in caster wheels, wheels for lawn mowers and various other relations.

The main objects of this invention are:

First, to provide a bearing assembly having antifriction bearings which may contain lubricant and at the time the lubricant is effectively retained and entrance of foreign matter to the bearings is prevented.

Second, to provide a wheel bearing assembly in which the bearings are effectively sealed and one in which the spindle member of the assembly is adapted to be non-rotatably mounted on a nonrotatable spindle or support.

Third, to provide an improved sealed or closed bearing structure comprising a spindle and wheel and their coacting parts, the parts being economically produced and assembled.

Objects relating to details and economies of the invention will appear from the description to follow. The invention is defined and pointed out in the claims.

A preferred embodiment of the invention is illustrated in the accompanying drawing, in which:

Fig. 1 is a fragmentary view mainly in section on a line corresponding to 1—1 of Fig. 2, one of the bearing closure members being shown in partially engaged position.

Fig. 2 is an end elevational view looking from the left of Fig. 1.

Fig. 3 is a perspective view of one of the bearing closure members.

The embodiment of my invention illustrated comprises a spindle member 1 adapted to be nonrotatably mounted on a fixed spindle or support. The spindle member 1 has an axial bore 2 adapted to receive the support member.

The spindle member 1 is provided with an axially spaced spindle bearing seats 3 having outwardly facing shoulders 4 at their inner ends. The spindle bearings 5 are formed as sheet metal stampings and are of general angle section facing inwardly and are sleeved upon the spindle member with their inner edges against the shoulders 4 thereof and secured by upsetting the spindle at 6 thus fixedly connecting them to the spindle.

The wheel designated generally by the numeral 7 is desirably formed of two sheet metal stamping members and include relatively narrow web portions 8 fixedly connected by welds as indicated at 9. The wheel members are flared outwardly at 10 to provide a rim adapted to receive a tire, not illustrated. The wheel members have outwardly offset inner portions 11 terminating in radially disposed flanges 12 to which the outwardly projecting flanges 13 of the outer bearing members 14 are secured as by the welds 15. The bearing members 14 are opposed to the bearing members 5 of the spindle member and constitute outer ball races for the balls 16.

To provide a lubricant chamber the tubular resilient chamber wall 17, which is desirably a section of a rubber tube, is arranged between the wheel member to resiliently and sealingly embrace the bearing members 14.

The bearing closure members 18 are desirably formed of synthetic rubber and are circular and disc like and have spindle member receiving openings 19 therein.

The spindle member has ends 20 projecting outwardly beyond the bearing thereof, preferably of reduced diameter, and having annular grooves 21 therein. The outer wall 22 of these grooves are, in the preferred embodiment illustrated, disposed in a radial plane and the inner walls 23 are inclined inwardly.

The diameter of the holes 19 of the members 18 is less than the diameter of the spindle at the bottoms of the grooves so that the closure members are under stretching stress when they are engaged with the spindle.

When the closure members are thus engaged with the spindle members they are not only retained by such stress or tension but owing to the cross sectional shape of the groove and the tension on these members they are dished inwardly, as illustrated at the left of Fig. 1, and their outer or peripheral portions urged into side thrust yielding engagement with the side portions of the wheel at the outer sides of the bearings thereof. This provides effective closures for the bearings retaining lubricant therein and also excluding foreign matter therefrom.

There is very little frictional thrust on the wheel acting to retard its rotation but an effective seal is provided. If desired one of the closure members may be removed to renew lubricant or an edge lifted away from the surface of the wheel to permit introduction of a lubricant gun or oil can or the like. Desirably a non-flowing or packing lubricant is used.

The closure members are very economically produced and may be easily and quickly removed if occasion requires as they are easily mounted on and removed from the spindle. The step of mounting or removing is illustrated in Fig. 1.

I have preferred to form the closure members of sheets of synthetic rubber such as neoprene. Other resilient or elastic materials may be used. However, the material such as neoprene is highly desirable as it provides an effective seal and may be easily mounted on the spindle member and has very little frictional engagement with the wheel and there is little wear on the closures.

Further advantages are that the closures yield to any motion either axial or tilting that may be present between the spindle and wheel and this makes it unnecessary to use great accuracy in the forming or machining or fitting of the parts of the assembly. There are many uses where some movement between the wheel parts and the spindle is not particularly objectionable.

I have illustrated and described my invention in a highly practical embodiment. I have not attempted to illustrate other embodiments or adaptations that I contemplate as it is believed this disclosure will enable those skilled in the art to embody or adapt my invention as may be desired.

Having thus described my invention, what I claim as new and desire to secure by Letters Patent is:

1. A wheel and bearing assembly comprising a spindle member having axially spaced bearing member seats provided with outwardly facing shoulders at their inner ends, a wheel having axially spaced inner portions, annular outer bearing members having outturned flanges at their outer edges lapped upon and fixedly secured to the outer sides of said inner portions of said wheel, spindle bearing members disposed on said spindle member in supported engagement with the shoulder thereof, said spindle member being upset into lapping retaining engagement with said bearing members, anti-friction bearing elements coacting with said inner and outer bearing members, said spindle member having reduced end portions projecting beyond said bearings thereon, said reduced portions having annular grooves therein, the outer walls of which are reon and having an outwardly facing annular
ion disposed at the outer side of said bearing
ubstantially radially spaced from said spindle
d in a plane at the inner side of the plane of
the said closure member having a hole there-
eter less than the diameter of the spindle mem-
)ottom of said groove and being stretchingly
aid groove, the said groove being of a size and
ain the said closure member therein under in-
ing tension with the outer portion thereof in
engagement with the said annular surface on
and whereby said closure member is free for
ement between said spindle and said surface
el.

el and bearing assembly comprising a spindle
)vided with bearings, a wheel rotatable on said
id wheel having outwardly facing annular sur-
led in planes at the outer sides of said wheel
e ends of the spindle member projecting sub-
eyond the planes of said surfaces, and elas-
ient initially flat disk-like closure members
dle openings therein of a less diameter than
r of the spindle member at the points of their
therewith stretchingly engaged upon said
nber in outwardly spaced relation to the planes
lular surfaces of said wheel and in inwardly
ion thereto with the outer portions thereof in
iping resilient thrust engagement with the said
faces of said wheel, said closure members being
stically resilient flexing movement thereof be-
engagement with said spindle member and
r surfaces of said wheel, the spindle member
ided with radially projecting and axially in-
ng shoulders on its outer ends, said shoulders
radially inwardly of the radius of said bear-
>acting with the stretchably engaged closure
>r retaining the closure members thereon in
nwardly dished relation to the wheel.

el and bearing assembly comprising a spindle
)vided with a bearing, a wheel rotatable on said
id wheel having an outwardly facing annular
)osed in a plane at the outer side of said wheel
e end of the spindle member projecting sub-
eyond the plane of said surface and having a
ending and axially inwardly facing projection
minating radially inwardly of the radius of said
ing, and an elastically resilient initially flat
osure member having spindle opening therein
engaged upon said spindle member in out-
ced relation to the plane of said annular sur-
l wheel and in inwardly dished relation thereto
uter portion thereof in yielding side lapping
rust engagement with the said annular surface
el, said closure member engaging said projec-
radially inner edge and being free for elas-
lient flexing movement between said spindle
d said annular surface of said wheel.

ferences Cited in the file of this patent

UNITED STATES PATENTS

| | | |
|---|---|---|
| Beemer | | June 19, 1928 |
| Ronish | | Sept. 2, 1941 |
| Booth | | Mar. 6, 1951 |
| Douglas et al. | | June 30, 1953 |
| Potter | | May 11, 1954 |
| Kindig | | Feb. 22, 1955 |